July 15, 1969  C. B. BLAIR  3,455,477
MATERIAL HANDLING DEVICE
Filed July 24, 1967
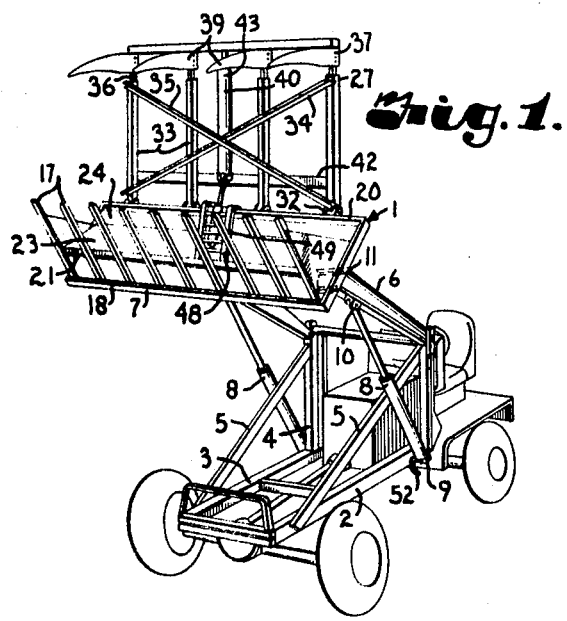
INVENTOR.
CALVIN B. BLAIR
BY
Fishburn, Gold & Litman
ATTORNEYS

United States Patent Office 3,455,477
Patented July 15, 1969

3,455,477
MATERIAL HANDLING DEVICE
Calvin B. Blair, Barnard, Kans., assignor to United Manufacturers, Inc., Barnard, Kans., a corporation of Kansas
Filed July 24, 1967, Ser. No. 655,617
Int. Cl. B66f 7/08
U.S. Cl. 214—767                               2 Claims

ABSTRACT OF THE DISCLOSURE

A material handling device for use on self-propelled vehicles including a loader frame having lift arms pivoted at their rear terminals on the frame and a basket or scoop member mounted on the forward terminals of the lift arms. The basket or scoop has a plurality of tines extending forwardly from a lower edge of an upright frame and a retaining means pivotally mounted on an upper edge of the frame. A web plate is installed beneath the tines for handling small material. The retaining means is power operated and includes a plurality of telescoping members mounted on the upper edge of the scoop frame and a tooth mounted near the outer ends of the telescoping portions of said members, the teeth being in transverse relation to the members. The retaining means is movable between an upwardly directed position and a forwardly and downwardly directed position with the material engaging teeth being movable between an extended position and a retracted position to engage, compress and hold the material in said scoop.

---

The material handling device is particularly adapted to picking up and moving material such as unbaled hay, silage, straw, corn stalks, tangled sorghums, beet pulp, sugar cane pulp, pea vines, rocks, tree limbs, stumps, bark, and the like. With the installation of a web plate beneath the tines, the device is adapted to pick up and move small sized material such as manure, corn cobs, nut shells, dirt, sand, gravel, snow, oyster shells, fertilizer, ground hay, and the like.

The principal objects of the present invention are: to provide a mobile material handling device adapted for use with a self-propelled loader, tractor, or truck of the type having load elevating apparatus; to provide such a device adapted to pick up, move, and unload material quickly without hand labor other than the operator of the vehicle; to provide such a device having an extensible material retaining means adapted to move material into said scoop, compact same therein, and then move additional material into said device; to provide such a device having a plurality of forwardly directed tines mounted along a lower edge of a basket frame and a plurality of extensible arms mounted along an upper edge of the basket frame, the arms each having a material engaging tooth mounted adjacent their ends; to provide such a device wherein the tines and teeth cooperate to retain the material in the device for high speed travel of the self-propelled loader; to provide such a device being adapted for a plurality of spacings of the tines corresponding to proposed uses; and to provide a versatile material handling device which is easily installed on the various models of self-propelled loaders, tractors, and trucks which is simple and rugged in construction and which may be operated by relatively unskilled labor.

Other objects and advantages of this invention will become apparent from the following description taken in connection with the accompanying drawings, wherein are set forth by way of illustration and example certain embodiments of this invention.

FIG. 1 is a perspective view of the material handling device embodying features of the present invention mounted on a self-propelled vehicle.

FIG. 2 is a fragmentary side elevational view with portions broken away to show the device with the material retaining means in the open or upwardly directed position.

FIG. 3 is a fragmentary side elevational view of the device showing the material engaging teeth in the extended and retracted positions in broken lines.

FIG. 4 is a perspective view of a modified form of the present invention having web plates between the tines.

Referring more in detail to the drawings:

The reference numeral 1 generally designates a material handling device adapted for use on self-propelled vehicles having an hydraulic system, including a frame 2 having a pair of side rails 3, rear standards 4, and brace members 5. Pivotally mounted to the upper portion of the standards 4 are forwardly extending boom arms 6, upon the forward free end of which is pivotally mounted a fork or scoop 7.

The boom arms 6 are raised and lowered by operation of a pair of hydraulic cylinders 8 having their lower ends pivotally secured to the rails 3 as at 9 (FIG. 1), and their other ends pivotally secured to the boom arms 6 as at 10. The forward ends of the boom arms 6 are turned downwardly at an angle as indicated at 11 (FIG. 4). The scoop 7 is pivotally mounted on the said ends of the booms as at 12. The fork 7 is adapted to be tilted downwardly and upwardly by a pair of hydraulic cylinders 13 having one end secured to the angled portion 11 of the booms and their other ends to a vertical back portion 14 of a frame 15 of the scoop 7 as at 16, as shown in FIG. 2. In the illustrated structure the boom arms 6 have their rear terminals pivotally mounted on the standards 4 of the frame and their forward terminals pivotally supporting the scoop 7.

The fork 7 includes a plurality of laterally spaced apart tines 17 attached along a lower edge 18 of the frame 15. In the illustrated structure, cylinder rods 19 of the tilting hydraulic cylinders 13 are pivotally connected to the back portion 14 of the frame 15 intermediate the lower edge 18 and an upper edge 20.

A reinforcing member 21 ties the tines 17 together as a unit and is shown here as an angle secured to the tines 17 and spaced forwardly of the frame 15. A plurality of braces 22 extend between the frame 15, intermediate the upper edge 20 and the lower edge 18, and the reinforcing member 21. In the illustrated structure, a brace 22 is positioned at each of the opposite ends of the reinforcing member 21.

A lower of bottom frame plate 23 and an upper or top frame plate 24 close a rearward surface of the frame 15 to prevent small sized material such as earth, gravel, nut shells, and the like from passing therethrough. The plates 23 and 24 define the rear of the fork 7. In the illustrated structure the bottom frame plate 23 is secured to the braces and extends between the frame 15 and the reinforcing member 21. The top frame plate 24 is secured on and supported by a plurality of upright members 25 extending between the upper and lower edges 20 and 18, respectively. Upright members 25 are positioned adjacent opposite ends of the frame 15. The top frame plate 24 extends from the bottom frame plate 23 to a frame member 26 adjacent the upper edge 20. In the illustrated structure the bottom frame plate 23 is inclined forwardly and outwardly from the frame 15 corresponding to the angle formed by the braces 22 with the upright members 25.

A material retaining means and rake 27 is pivotally mounted on the upper edge 20 and is adapted to grasp material between the material retaining means and the tines 17. The material retaining means 27 is pivotable between an open or upwardly directed position 28 as shown in FIG. 2 and a closed or forwardly directed position 29 as shown in FIG. 3. The material retaining means 27 is movable between an extended or material gathering position 30 and a retracted or material retaining or compressing position 31 as shown in broken lines in FIG. 3.

The material retaining means or rake 27 is adapted for severe use as in tightly packed or frozen material and for holding heavy material like pulp or sawlogs, brush, rocks, and the like. The material retaining means 27 also considerably increases the amount of loose or bulky material that can be handled by the fork 7 with the increase being from three to five times depending on the material being handled.

In the illustarted structure, the material retaining means or rake 27 is pivotally mounted on the upper edge 20 through a plurality of spaced brackets 32. The material retaining means 27 comprises a plurality of tubular members or arms 33 having one end pivotally secured to the brackets 32, as shown in FIG. 1, and are X or cross braced as indicated at 34 and 35, thereby forming a rigid unit. Telescoped within said tubular members 33 are rod members 36. Secured to outer ends 37 of the rod members 36 and rigidly mounted thereon is a cross bar or support member 38. Secured to the outer ends 37 of the rods 36 and adjacent the cross bar 38 by suitable means, such as bolts, rivets, or the like, are laterally extending material engaging teeth 39. The teeth 39 are tapered toward their free ends and extend generally in a direction toward the fork 7. The rods 36 are extendible and retractable in the tubular members 33 by an hydraulic cylinder 40 having one end pivotally secured to a bracket 41 mounted on a cross member 42 on the rear lower portion, as shown in FIG. 2. The rod end 43 of the hydraulic cylinder 40 is attached to the cross bar 38, as also shown in FIG. 2. Fluid is supplied to the cylinder 40 through a tube 44 from a source of supply (not shown) carried by the vehicle.

In order to open and close the material retaining means, I provide an hydraulic cylinder 45 having one end secured to a bracket 46 below lower frame plate 23, as illustrated in FIG. 2. The rod end 47 of the hydraulic cylinder 45 is pivotally attached to the cross member 42 of the material retaining means, as best illustrated in FIG. 3.

In order to protect the hydraulic cylinder 45 and rod, I provide a cage 48 which consists of spaced plate members 49 and cross rods 50 having one end attached to the lower frame plate 23, and the other end to the upper edge 20. Fluid is supplied to the cylinder 45 through a tube 51, also from a source of supply (not shown), and fluid is supplied to a tube 52 for the hydraulic cylinders 8 for lifting the booms 6, from the same source carried by the vehicle.

FIG. 4 illustrates a modified form of the present invention which is particularly adapted for scooping jobs such as snow, sand, dirt, fertilizer, ground hay, cobs, oyster shells, pellets, cubes, and the like.

A material retaining space is formed in the fork 7 by installing web plates 53 between the tines 17 and mounting end plates 54 on the fork 7. The end plates 54 are mounted on opposite ends of the frame 15 and extend forwardly therefrom and are mounted on the tines 17 adjacent the opposite ends of the frame 15. The web plates 53 each extend forwardly from the reinforcing member 21 to adjacent a forward end 55 of the respective tines 17, thereby forming the material retaining member adjacent the lower edge 18. In the illustrated structure the end plates 54 are triangular in shape with an upper edge 56 extending from a point on each opposite end of the frame 15 intermediate the lower edge 18 and the upper edge 20 thereof, to adjacent the forward end 55 of the tine 17 adjacent the respective opposite ends of the frame 15. The lower edge 57 of each end plate 54 extends from adjacent the forward end 55 to the respective opposite end of the reinforcing member 21 thereby enclosing a space for small sized material such as snow, sand, gravel, oyster shells and the like. Th web plates 53 and end plates 54 are also adapted for use with the fork 7 shown in FIGS. 1 to 3, inclusive.

A power means such as an hydraulic cylinder 58 and cylinder rod 59 is operable to move a material retaining means 60 between an upwardly directed or open position 61 as shown in FIG. 4 and a forwardly directed or closed position similar to the forwardly directed or closed position 31 as shown in FIG. 3.

The material retaining means 60 is formed by a plurality of standards 63 with each having one end pivotally mounted on an upper edge 64 of a frame 65. The standards 63 are laterally spaced apart along the upper edge 64 similar to the tubular arms 33. A material engaging tooth 66 is mounted adjacent the other end of each of the standards 63 and a support member 67 ties the standards 63 together as a rigid unit by being mounted on the other ends thereof. A cross bracing member 68 is mounted on the standards 63, thereby strengthening the standards 63, and extends from adjacent the one end of a standard 63 adjacent one end of the frame 65 to adjacent the other end of another standard 63 adjacent the other end of the the frame 65.

The fork 7 and the modified form illustrated in FIG. 4 is extremely versatile in material handling when placed on boom arms 6 of a suitable prime mover such as a truck, tractor or loader. The lower edge 18 is punched for installation of four, six, ten or sixteen tines. The four tines 17 are spaced twenty-five inches part and the device is adapted for bulky material such as logs, power poles, lumber and the like. The six tines 17 are spaced fifteen inches apart and the device is adapted for handling stacked material, brush, bedding manure and the like. The six tine device is extremely versatile when the web plates 53 are installed between the tines 17. The ten tines 17 are spaced eight inches apart and the device is adapted for use with flail cut silage, ordinary manure and the like. The sixteen tines 17 are spaced five inches apart and the device is adapted for use with fine cut silage, chopped hay, regular manure, rocks, roots, brush, limbs, packed snow and the like.

In operation, the fork 7 is lowered and the material retaining means is opened to the upwardly directed position. The vehicle is then driven forward with the tines being driven into the material, the teeth on the material retaining means are moved to the extended position, and then the material retaining means is moved to the forwardly directed or closed position. The teeth are then retracted, thereby raking additional material, such as loose hay, onto the tines. The loose material is compacted on the fork 7 by repeating the movements previously described until the fork 7 will not hold additional material. The material retaining means remains closed while the vehicle is driven to a discharge point. The fork 7 is raised and tilted downwardly toward the stacking area. The material retaining means is then moved to the open position and the material is discharged onto a stack or into a wagon or truck.

It is to be understood that while certain forms of this invention have been illustrated and described, it is not to be limited to the specific forms or arrangement of parts herein described and shown except insofar as such limitations are included in the claims.

What I claim and desire to secure by Letters Patent is:

1. In a vehicle for hauling materials having a pair of forwardly extending booms pivoted at their rear terminals to the vehicle, a scoop mounted on the forward terminals of said booms and having a back portion and an upper edge, means for raising and lowering said booms and said scoop, means for retaining material on said scoop comprising:

(a) a plurality of tubular members pivotally secured to the upper edge of said scoop,
(b) rods telescoping in said tubular members, (c) a cross member secured to the outer free ends of said rods, (d) a cross bar secured to said tubular members spaced from said cross member, (e) teeth rigidly secured to said rods and extending laterally therefrom and normally toward said scoop, (f) hydraulically operated extensible means having one end pivotally secured to said cross bar and its other end to said scoop forwardly of said back portion, (g) hydraulically operated extensible means having one end pivotally secured to said cross member and its other end to said cross bar for extending and retracting said rods in said tubular members, (h) whereby said material retaining means may be extended outwardly of said scoop to move the material onto said scoop and compact the same therein.

2. In combination, a material handling device and a self-propelled vehicle having lifting booms pivoted at their rear terminals to said vehicle, said device being pivotally mounted on the forward terminals of said lift arms and comprising:

(a) a receiving member having a forwardly projecting bottom portion and a generally upwardly projecting back portion, said back portion having an upper edge, (b) material retaining means including projecting teeth, said retaining means being pivotally mounted on said receiving member at said upper edge for movement of said teeth between a position upwardly of said back portion and a position forwardly of said back portion for retaining material between said teeth and said back portion, (c) power means connected to said receiving member and said retaining means and positioned forwardly of said back portion and at least partially below said upper edge for urging said material retaining means between said upward position and said forward position, (d) means permitting said teeth to extend and retract radially of said upper edge, and (e) power means carried by said retaining means for selectively extending and retracting said teeth for compacting material against said back portion.

References Cited

UNITED STATES PATENTS

| | | | |
|---|---|---|---|
| 3,008,597 | 11/1961 | Brudi et al. | 214—654 |
| 3,305,262 | 2/1967 | Lull | 214—654 X |
| 3,338,442 | 8/1967 | Armeneau et al. | 214—767 |
| 2,705,082 | 3/1955 | Heimsoth | 214—510 |
| 2,768,760 | 10/1956 | Pilch | 214—510 |
| 3,163,304 | 12/1964 | Kohorst et al. | 214—767 X |
| 3,208,612 | 9/1965 | Blaim | 214—144 |

HUGO O. SCHULZ, Primary Examiner

U.S. Cl. X.R.

214—147